United States Patent [19]

Bergman

[11] 4,146,237
[45] Mar. 27, 1979

[54] SEALING DEVICE FOR STIRLING ENGINE PISTON ROD IN WHICH NO SEPARATION OF OIL AND GAS IS NECESSARY

[75] Inventor: Ulf C. Bergman, Malmo, Sweden

[73] Assignee: Kommanditbolaget United Stirling (Sweden) AB & Co., Malmo, Sweden

[21] Appl. No.: 803,786

[22] Filed: Jun. 6, 1977

[51] Int. Cl.² .............................................. F16J 15/56
[52] U.S. Cl. ......................................... 277/3; 277/15
[58] Field of Search ....................... 277/28, 29, 135, 3, 277/27, 15

[56] References Cited

U.S. PATENT DOCUMENTS

| 3,145,995 | 8/1964 | Adamson et al. | 277/28 |
| 3,810,634 | 5/1974 | Hakansson | 277/3 |
| 3,848,877 | 11/1974 | Bengtsson | 277/3 |
| 4,083,566 | 4/1978 | Bengtsson | 277/3 |

Primary Examiner—Robert I. Smith
Attorney, Agent, or Firm—Laurence R. Brown

[57] ABSTRACT

In Stirling engines the high pressure of the cycle requires special seals on the piston rod to prevent leakage of gas out of the high pressure cylinder into lower pressure regions such as a crankcase. A liquid oil seal is developed in a chamber around the piston rod by movement of the piston rod to carry oil into the chamber which is limited by an upper scraper member and a lower sealing gland. The chamber leads to a membrane operated pressure comparison valve releasing oil from the chamber when its pressure exceeds that of the gas in the high pressure cylinder. No gas need be pumped back into the high pressure chamber and thus no separation of gas and oil is necessary.

9 Claims, 1 Drawing Figure

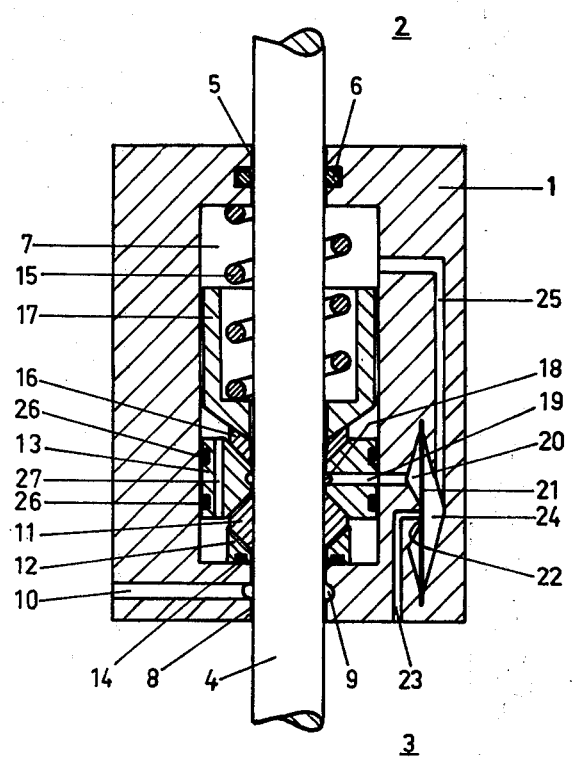

SEALING DEVICE FOR STIRLING ENGINE PISTON ROD IN WHICH NO SEPARATION OF OIL AND GAS IS NECESSARY

This invention relates to a sealing device for preventing gas leakage beside a rectilinearly reciprocating piston rod from a chamber containing gas at a high pressure, the device comprising a scraper ring adapted to prevent transfer of lubricating oil along the piston rod into the said chamber.

BACKGROUND AND OBJECTS

It is known to provide such a sealing device with means for combined draining of the oil accumulated by the scraper ring and of gas leaking through said scraper ring. In many cases it will be desirable to pump the leaked gas back to the high pressure chamber after it has been separated from its oil contents. This arrangement has the drawback that the oil separator needs service at intervals, and consequently one object of the present invention is to provide a sealing device in which no separation of oil and gas will be necessary.

BRIEF DESCRIPTION OF THE INVENTION

According to the present invention there is provided a sealing device for preventing gas leakage beside a rectilinearly reciprocating piston rod from a chamber containing gas at a high pressure, the device comprising a scraper ring adapted to prevent transfer of lubricating oil along the piston rod into the said chamber, characterized in that said scraper ring adjoins an oil-collecting space provided with oil outlet means furnished with a valve which allows oil to pass through the oil outlet means only when the pressure within the oil-collecting space exceeds the pressure of the gas within the said chamber.

Preferably the oil-collecting space is also adjoined by a resilient sealing gland which is continuously forced against the piston rod, and there are means for supplying oil to the surface of the piston rod adjacent to and on the low pressure side of the said gland.

In an advantageous construction there is a duct leading from a cavity filled with gas from the said chamber to the said valve for the purpose of subjecting the valve to gas pressure which has to be overcome by the pressure within the oil-collecting space before the valve opens, and the valve comprises a valve seat and a diaphragm which can engage the valve seat and is subjected on one side to the pressure within the oil-collecting space and on the other side to the said gas pressure.

This solves sealing problems encountered in Stirling cycle engines where a gas charge such as helium at high pressure is prevented from leaking, and is kept in pure condition without oil contamination.

THE DRAWING

How the invention may be put into practice is described in more detail with reference to the accompanying drawing which shows a sealing device according to the invention in vertical section.

DETAILED DESCRIPTION

The drawing shows a housing 1 forming part of a wall separating a chamber 2 containing gas at a high pressure from a space 3 containing gas at a substantially lower pressure. A piston rod 4 extends through an opening in the housing 1. The opening includes an upper cylindrical part 5 containing a cap seal 6, an intermediate cylindrical cavity 7 of larger diameter, and a lower cylindrical part 8 containing a groove 9 for lubricating and cooling oil supplied via a channel 10. A resilient sealing gland 11 made of fibreglass-reinforced polytetrafluoroethylene surrounds the piston rod 4. The gland 11 is wedged between metal rings 12 and 13, the lower metal ring 12 engaging a shoulder surface limiting the space 7. An O-ring 14 prevents leakage of gas between the ring 12 and the adjacent surface of the housing 1. The rings 12 and 13 have conically tapering surfaces to engage the gland 11, and an axial compressing force from a spring 15 is constantly being transmitted through said conically tapering surfaces. Thus the gland 11 will always be forced against the piston rod 4.

A scraper ring 16 is wedged between conically tapering surfaces respectively on the upper ring 13 and on a spring support 17. The cone top angle of the surface on the upper ring 13 engaging the scraper ring 16 is somewhat smaller than the cone top angle of the engaging surface of the spring support 17. Thus the scraper ring 16, which is transmitting the force of the spring 15, will be wedged into contact with the piston rod 4. The cap seal 6 does not have any real sealing effect, but it will ensure that the pressure inside the cavity 7 corresponds at least approximately to the mean pressure in the chamber 2 in case of sudden cyclical pressure variations in the chamber 2; generally the pressure in the cavity 7 is equal to that in the chamber 2.

The ring 13 is provided with an annular groove 18 and a radial channel 19 leading to a chamber 20 limited by a membrane 21. The membrane 21 acts as a valve member engaging a valve seat 22 surrounding an opening of an outlet channel 23. The membrane 21 also limits a chamber 24 communicating with the cavity 7 through a channel 25. Two O-rings 26 prevent leakage between the cavity 7 and the channel 19. An axial bore 27 in the ring 13 ensures an equal gas pressure in all parts of the cavity 7.

The chamber 20, channel 19, groove 18, and small clearances between the ring 13 and the piston rod 4 together constitute an oil-collecting space which is adjoined and axially limited by the scraper ring 16 and the gland 11.

The illustrated device operates as follows

During operation the rod 4 reciprocates in its axial direction. Oil is supplied through the channel 10, and an oil film will be formed on the surface of the rod 4. Most of this oil film will be wiped off by the gland 11, but a thin layer of oil will be drawn through the gland 11 and reach the groove 18. The scraper ring 16 will not allow any oil to pass further along the rod surface and thus at a low rate oil will continuously accumulate in the oil-collecting space comprising the groove 18. The oil pressure in the groove 18, the channel 19 and the chamber 20 will increase until it becomes sufficient to lift the membrane 21 from the valve seat 22 around the opening of the outlet channel 23. The maximum oil pressure in the chamber 20 is determined by the gas pressure in the cavity 7, which gas pressure is transmitted to the chamber 24 via the channel 25. The effective area of the membrane 21 exposed to the chamber 24 is a little larger than its area exposed to the chamber 20, and thus the oil pressure in the groove 18 will be maintained a little higher than the gas pressure in the cavity 7.

The scraper ring 16 will thus act as a seal against the movement of oil in the direction towards the cavity 7. It will be understood that the difference between the oil pressure in the groove 18 and the gas pressure in the cavity 7 may be comparatively much smaller than the difference between the gas pressure in the cavity 7 and in the space 3. Also it is well known that it is much easier to obtain a reliable seal against leakage of a liquid than against leakage of a gas — in particular if the gas contains small size molecules or atoms (helium or hydrogen).

What is claimed is:

1. Sealing means for preventing gas leakage out of a high pressure chamber in a path around a rectilinearly reciprocating piston rod into a lower pressure region comprising in combination means for conveying into a groove surrounding said rod in the lower pressure region oil forming a film of oil on said rod, a sealing gland about the rod in a low pressure region between said groove and the high pressure chamber, means for scraping the oil from said rod, a reservoir accumulating a store of oil scraped from the film of oil carried by the rod from the lower pressure groove in the direction toward the higher pressure chamber, said oil reservoir having a groove positioned about said rod in a position between said high pressure chamber and said sealing gland, an outlet path to remove oil from said reservoir, and a pressure responsive valve controlling said outlet path by monitoring respecting pressures of said high pressure chamber and said oil reservoir to release oil from said reservoir chamber when the reservoir pressure exceeds that of the high pressure chamber, whereby the liquid oil in said reservoir seals said gas leakage path around the piston rod.

2. Means as defined in claim 1 including a scraper ring biased into contact with said piston rod comprising an upper limit to said reservoir.

3. Means as defined in claim 1 wherein said sealing gland is a resilient member circumferentially forced against said piston rod comprising a lower limit to said reservoir.

4. Means as defined in claim 1 including a passage for supplying cooling oil under pressure to the surface of said piston rod in said lower pressure region.

5. Means as defined in claim 1 wherein said valve has a movable membrane located between said high pressure region and said reservoir and engaging a valve seat in said outlet path.

6. Means as defined in claim 1 wherein said oil reservoir comprises an annular groove in a movable ring surrounding said piston rod.

7. Means as defined in claim 6 wherein said movable ring has opposed conical surfaces registered with conical surfaces of an oil scraper ring on the high pressure side and a resilient sealing gland on the low pressure side and resilient means urging said conical surfaces together.

8. Means as defined in claim 7 including a pressure relieving passageway through said ring in a direction substantially parallel to said piston rod.

9. Means as defined in claim 6 wherein said outlet path passes in part through said movable ring.

* * * * *